United States Patent
Zabic

(10) Patent No.: US 10,713,824 B2
(45) Date of Patent: Jul. 14, 2020

(54) SYSTEM AND METHOD FOR 3D IMAGE RECONSTRUCTION FROM AXIAL STEP-AND-SHOOT CT

(71) Applicant: UIH AMERICA, INC., Houston, TX (US)

(72) Inventor: Stanislav Zabic, Cleveland, OH (US)

(73) Assignee: UIH AMERICA, INC., Houston, TX (US)

( * ) Notice: Subject to any disclaimer, the term of this patent is extended or adjusted under 35 U.S.C. 154(b) by 204 days.

(21) Appl. No.: 16/019,498

(22) Filed: Jun. 26, 2018

(65) Prior Publication Data

US 2019/0392615 A1 Dec. 26, 2019

(51) Int. Cl.
*G06T 11/00* (2006.01)
*G06T 15/08* (2011.01)

(52) U.S. Cl.
CPC .......... *G06T 11/006* (2013.01); *G06T 11/008* (2013.01); *G06T 15/08* (2013.01); *G06T 2211/421* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,875,225 A * | 2/1999 | Wallschlaeger | ....... | A61B 6/032 378/15 |
| 6,421,411 B1 * | 7/2002 | Hsieh | ..................... | A61B 6/032 378/19 |
| 6,983,034 B2 * | 1/2006 | Wang | ................... | G01N 23/046 378/15 |
| 8,731,267 B2 * | 5/2014 | Nakanishi | ............. | G06T 11/005 382/131 |
| 9,380,984 B2 * | 7/2016 | Li | .......................... | A61B 6/032 |
| 9,576,391 B2 * | 2/2017 | Ra | .......................... | A61B 6/503 |
| 9,629,587 B2 * | 4/2017 | Okerlund | .............. | G06T 11/003 |
| 9,763,639 B2 * | 9/2017 | Lee | ....................... | A61B 6/5288 |
| 10,068,332 B2 * | 9/2018 | Zheng | .................. | A61B 6/5211 |
| 2004/0240604 A1 * | 12/2004 | Wang | .................... | G01N 23/046 378/19 |

(Continued)

*Primary Examiner* — Anand P Bhatnagar
(74) *Attorney, Agent, or Firm* — Metis IP LLC

(57) ABSTRACT

The disclosure relates to system and method for CT image reconstruction. The method may include: obtaining scanning data, wherein the scanning data is generated by at least one detector via a plurality of axial scans; obtaining a scanning parameter wherein the scanning parameter include a detector size; obtaining a requested reconstruction parameter; determining a plurality of requested image locations based on the scanning parameter and the requested reconstruction parameter; determining an intermediate reconstruction parameter based on the requested reconstruction parameter; determining a plurality of intermediate image locations based on the plurality of requested image locations and the intermediate reconstruction parameter; determining a intermediate image volume based on the plurality of intermediate images and the scanning data determining a final image volume based on the intermediate image volume and a filter; reconstructing an image of the subject based on the final image volume and the requested reconstruction parameters.

20 Claims, 12 Drawing Sheets

(56) References Cited

U.S. PATENT DOCUMENTS

| | | | |
|---|---|---|---|
| 2011/0075907 A1* | 3/2011 | Nakanishi | A61B 6/032 382/131 |
| 2015/0243045 A1* | 8/2015 | Ra | A61B 6/032 382/131 |
| 2015/0243070 A1* | 8/2015 | Ra | A61B 6/503 382/131 |
| 2016/0256127 A1* | 9/2016 | Lee | A61B 6/5288 |
| 2020/0066008 A1* | 2/2020 | Zabic | G06T 5/20 |

* cited by examiner

SYSTEM AND METHOD FOR 3D IMAGE RECONSTRUCTION FROM AXIAL STEP-AND-SHOOT CT

TECHNICAL FIELD

The present disclosure generally relates to image reconstruction, and more specifically relates to a system and method for reconstructing image from axial step-and-shoot CT.

BACKGROUND

Computed Tomography (CT) has been widely used for imaging and diagnosis. Step-and-shoot acquisition is an image acquisition technique characterized by stop scanning after every single angle during image acquisition and then moving the couch to a different location. However, 3D axial step-and-shoot reconstruction of CT data may produce shading artifacts due to various reasons, including poor sampling, poor filtering, and collimation errors. Therefore, there is a need to provide a process and system to improve the quality of the reconstructed medical image by reducing shading artifacts, overshoots, pinwheel artifacts, or the like, or any combination thereof.

SUMMARY

In a first aspect of the present disclosure, a system for reconstructing CT images is provided. The system may include at least one storage medium and at least one processor. The at least one storage medium may include a set of instructions. The at least one processor may be configured to communicate with the at least one storage medium, wherein when executing the set of instructions, the system is configured to perform one or more of the following operations. The system may obtain scanning data of a subject, wherein the scanning data is generated by at least one detector via a plurality of axial scans. The system may obtain a scanning parameter, wherein the scanning parameter includes a detector size of the at least one detector. The system may obtain a requested reconstruction parameter, wherein the requested reconstruction parameter includes a requested image increment and a requested image thickness. The system may determine a plurality of initial image locations based on the scanning parameter and the requested reconstruction parameter. The system may determine an intermediate reconstruction parameter based on the requested reconstruction parameter, wherein the intermediate reconstruction parameter includes an intermediate image increment and an intermediate image thickness. The system may determine a plurality of intermediate image locations based on the requested reconstruction parameters and the intermediate reconstruction parameter, wherein an amount of the plurality of intermediate image locations is larger than an amount of the plurality of initial image locations. The system may determine a plurality of intermediate images based on the plurality of image locations and the scanning data. The system may determine a plurality of final images based on plurality of intermediate images and a filtering kernel.

In some embodiments, the system may further determine a broadening size parameter based on the requested reconstruction parameter and the scanning parameter. The system may further determine the plurality of intermediate image locations based on the broadening size parameter, wherein the amount of the plurality of intermediate image locations is related to the broadening size parameter.

In some embodiments, the intermediate image thickness may equal to the detector size.

In some embodiments, the system may determine whether the scanning data is acquired with axial deflection. In response to a determination that the scanning data is acquired with axial deflection, the system may determine whether the requested image thickness exceeds the detector size. In response to a determination that the requested image thickness exceeds the detector size, the system may determine the intermediate image increment based on the requested image increment and the detector size. The system may determine the broadening size parameter based on the requested image thickness and the intermediate image increment.

In some embodiments, the system may determine the filtering kernel based on a ratio of the requested image thickness to the intermediate image increment.

In some embodiments, the system may determine whether the scanning data is acquired with axial deflection. In response to a determination that the scanning data is acquired with axial deflection, the system may determine whether the requested image thickness equals to the detector size. In response to a determination that the requested image thickness equals to the detector size, the system may determine the intermediate image increment as the requested image increment divided by three.

In some embodiments, the system may determine the filtering kernel based on a ratio of the detector size to the requested image increment.

In some embodiments, the system may whether the scanning data is acquired with axial deflection. In response to a determination that the scanning data is acquired without axial deflection, the system may determine whether a ratio of the requested image thickness to the detector size is not less than two. In response to a determination that the ratio of the requested image thickness to the detector size is not less than two, the system may determine the intermediate image increment based on the requested image increment and the detector size. The system may determine the broadening size parameter based on the requested image thickness and the intermediate image increment.

In some embodiments, the system may determine whether the scanning data is acquired with axial deflection. In response to a determination that the scanning data is acquired without axial deflection, the system may determine whether the ratio of the requested image thickness to the detector size is less than two. In response to a determination that the ratio of the requested image thickness to the detector size is less than two, the system may determine an overlap value between two adjacent axial scans of the plurality of axial scans. The system may determine the plurality of initial image locations based on the overlap value In some embodiments, a ratio of the overlap value to the detector size may be an even number.

In a second aspect of the present disclosure, a method is provided. The method may include one or more of the following operations. Scanning data of a subject may be obtained, wherein the scanning data is generated by at least one detector via a plurality of axial scans. A requested reconstruction parameter may be obtained, wherein the requested reconstruction parameter include a requested image increment and a requested image thickness. A plurality of initial image locations may be determined based on the scanning parameter and the requested reconstruction parameter. An intermediate reconstruction parameter may be determined based on the requested reconstruction parameter, wherein the intermediate reconstruction parameter includes an intermediate image increment and an intermediate image thickness. A plurality of intermediate image locations may be determined based on the requested reconstruction parameters and the intermediate reconstruction parameter, wherein an amount of the plurality of intermediate image locations is larger than an amount of the plurality of the initial image locations. A plurality of intermediate images may be determined based on the plurality of intermediate locations and the scanning data. A plurality of final images may be determined based on plurality of intermediate images and a filtering kernel.

In a third aspect of the present disclosure, a non-transitory computer readable medium is provided. The non-transitory computer readable medium may include executable instructions that, when executed by at least one processor, cause the at least one processor to effectuate a method. The method may include one or more of the following operations. Scanning data of a subject may be obtained, wherein the scanning data is generated by at least one detector via a plurality of axial scans. A requested reconstruction parameter may be obtained, wherein the requested reconstruction parameter include a requested image increment and a requested image thickness. A plurality of initial image locations may be determined based on the scanning parameter and the requested reconstruction parameter. An intermediate reconstruction parameter may be determined based on the requested reconstruction parameter, wherein the intermediate reconstruction parameter includes an intermediate image increment and an intermediate image thickness. A plurality of intermediate image locations may be determined based on the requested reconstruction parameters and the intermediate reconstruction parameter, wherein an amount of the plurality of intermediate image locations is larger than an amount of the plurality of the initial image locations. A plurality of intermediate images may be determined based on the plurality of intermediate locations and the scanning data. A plurality of final images may be determined based on plurality of intermediate images and a filtering kernel.

BRIEF DESCRIPTION OF THE DRAWINGS

The present disclosure is further described in terms of exemplary embodiments.

These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by other expression if they achieve the same purpose.

Figure 2:
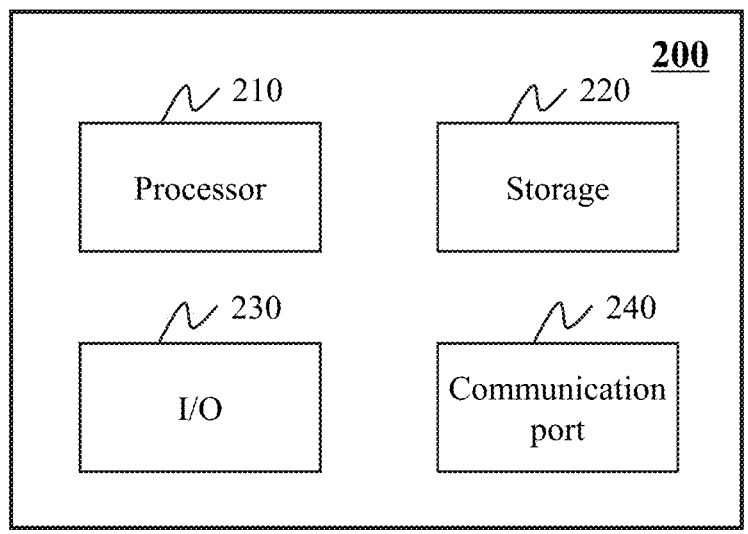
FIG. 2 is a schematic diagram illustrating an architecture of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included of connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and components for non-invasive imaging for the purposes of disease diagnosis or medical research. The present disclosure may reduce the shading artifacts in axial step-and-shoot reconstruction by introducing at least 10% of collimation overlap between the consecutive axial shots. The present disclosure may further eliminate data inconsistencies introduced by projection based broadening by reconstructing thin images and broadening those thin images in an image space. In some embodiments, the imaging system may be a computed tomography (CT) system, an emission computed tomography (ECT) system, a magnetic resonance imaging (MRI) system, an ultrasonography system, an X-ray photography system, a positron emission tomography (PET) system, or the like, or any combination thereof.

The following description is provided to help understanding CT image reconstruction methods or systems better. The term "image" used in this disclosure may refer to a 2D image, a 3D image, a 4D image, or any related image data. This is not intended to limit the scope the present disclosure. For persons having ordinary skills in the art, a certain amount of variations, changes, and/or modifications may be deducted under guidance of the present disclosure. Those variations, changes, and/or modifications do not depart from the scope of the present disclosure.

Figure 1A:
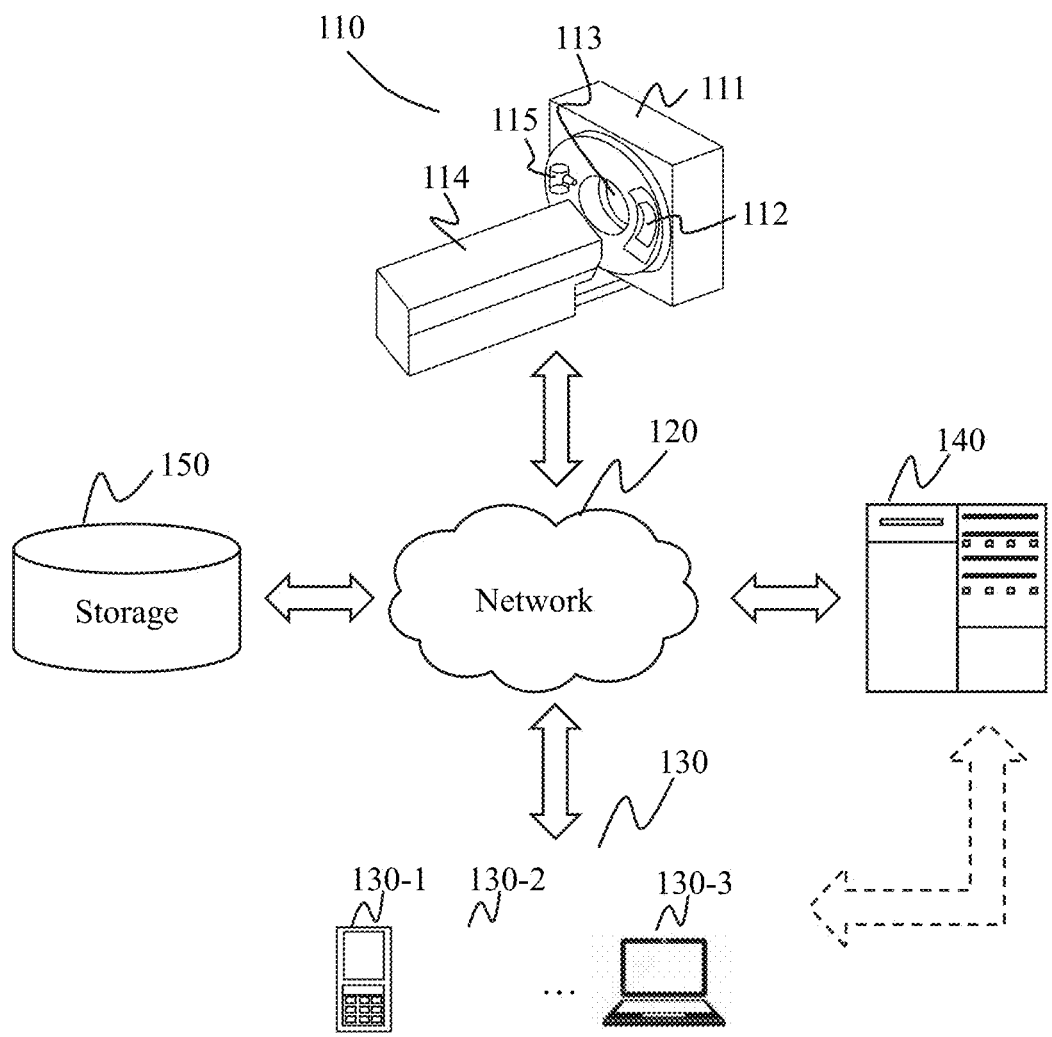
FIG. 1A is a schematic diagram illustrating an exemplary CT system according to some embodiments of the present disclosure.
Figure 1B:
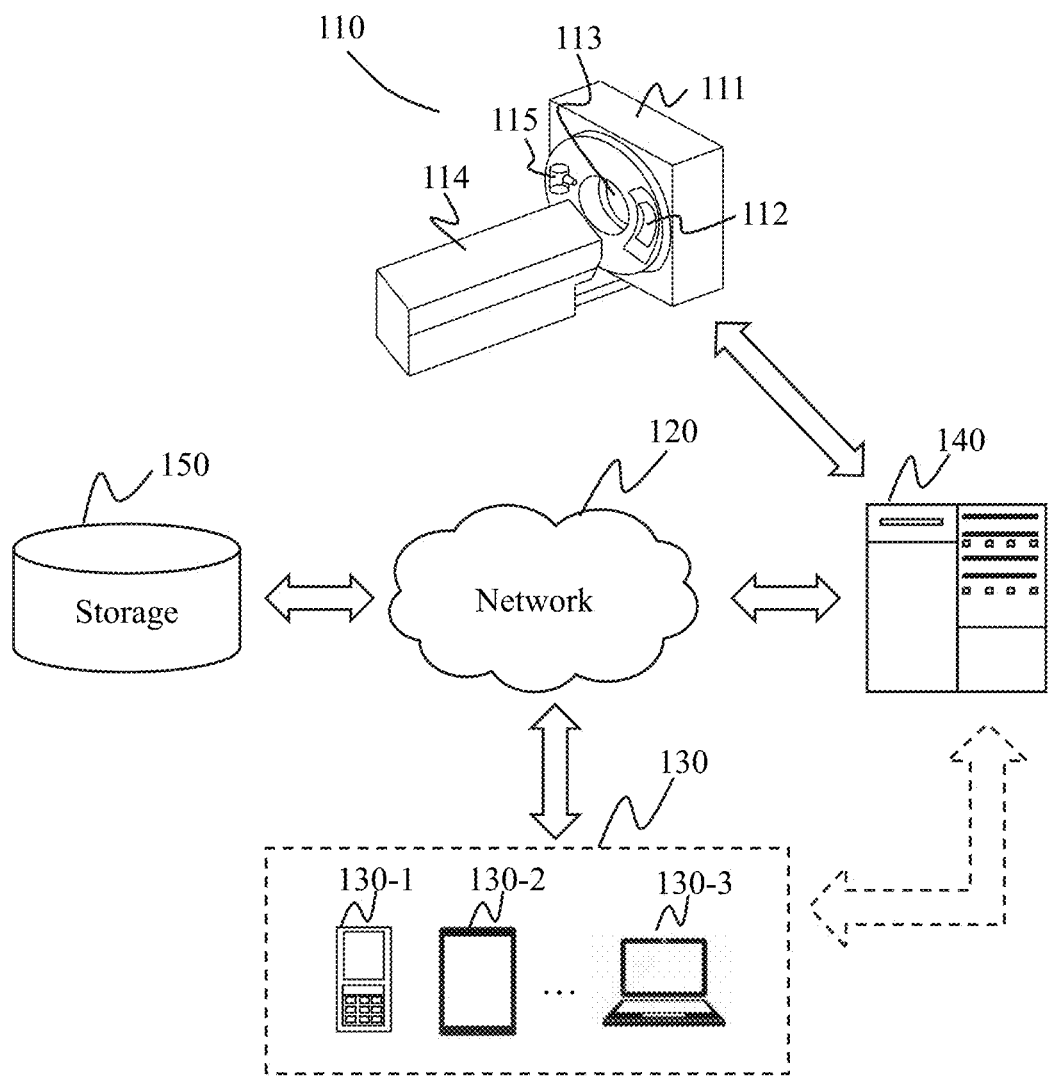
FIG. 1B is a schematic diagram illustrating an exemplary CT system according to some embodiments of the present disclosure.

FIG. 1A and FIG. 1B are a schematic diagrams illustrating an exemplary CT system according to some embodiments of the present disclosure. The CT system may include a CT scanner 110, a network 120, a terminal 130, a processing engine 140, and a storage 150.

The CT scanner 110 may include a gantry 111, a detector 112, a detecting region 113, a subject table 114, and a radioactive scanning source 115. The gantry 111 may support the detector 112 and the radioactive scanning source 115. A subject may be placed on the subject table 114 to be scanned. The radioactive scanning source 115 may emit radioactive rays to the subject. The detector 112 may detect radiation events (e.g., gamma photons) emitted from the detecting region 113. In some embodiments, the detector 112 may include a plurality of detector units. The detector units may include a scintillation detector (e.g., a cesium iodide detector) or a gas detector. The detector unit may be a single-row detector or a multi-rows detector.

The network 120 may facilitate exchange of information and/or data. In some embodiments, one or more components in the CT system 100 (e.g., the CT scanner 110, the terminal 130, the processing engine 140, or the storage 150) may send information and/or data to other component(s) in the CT system 100 via the network 120. For example, the processing engine 140 may obtain image data from the CT scanner 110 via the network 120. As another example, the processing engine 140 may obtain user instructions from the terminal 130 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points through which one or more components of the CT system 100 may be connected to the network 120 to exchange data and/or information.

The terminal 130 include a mobile device 130-1, a tablet computer 130-2, a laptop computer 130-3, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, the terminal 130 may be part of the processing engine 140.

The processing engine 140 may process data and/or information obtained from the CT scanner 110, the terminal 130, or the storage 150. In some embodiments, the processing engine 140 may be a single server, or a server group. The server group may be centralized, or distributed. In some embodiments, the processing engine 140 may be local or remote. For example, the processing engine 140 may access information and/or data stored in the CT scanner 110, the terminal 130, and/or the storage 150 via the network 120 (as illustrated in FIG. 1A). As another example, the processing engine 140 may be directly connected to the CT scanner 110 (as illustrated in FIG. 1B), the terminal 130 and/or the storage 150 to access stored information and/or data. In some embodiments, the processing engine 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing engine 140 may be implemented on a computing device 200 having one or more components illustrated in FIG. 2 in the present disclosure.

The storage 150 may store data and/or instructions. In some embodiments, the storage 150 may store data obtained from the terminal 130 and/or the processing engine 140. In some embodiments, the storage 150 may store data and/or instructions that the processing engine 140 may execute or use to perform exemplary methods described in the present disclosure. In some embodiments, the storage 150 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components in the CT system 100 (e.g., the processing engine 140, the terminal 130). One or more components in the CT system 100 may access the data or instructions stored in the storage 150 via the network 120. In some embodiments, the storage 150 may be directly connected to or communicate with one or more components in the CT system 100 (e.g., the processing engine 140, the terminal 130). In some embodiments, the storage 150 may be part of the processing engine 140.

FIG. 2 is a schematic diagram illustrating exemplary hardware and/or software components of an exemplary computing device 200 on which the processing engine 140 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (program code) and perform functions of the processing engine 140 in accordance with techniques described herein. The computer instructions may include routines, programs, objects, components, data structures, procedures, modules, and functions, which perform particular functions described herein. For example, the processor 210 may process image data obtained from the CT scanner 110, the terminal 130, the storage 150, or any other component of the CT system 100. In some embodiments, the processor 210 may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be note that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., a first processor executes step A and a second processor executes step B, or the first and second processors jointly execute steps A and B).

The storage 220 may store data/information obtained from the CT scanner 110, the terminal 130, the storage 150, or any other component of the CT system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure.

The I/O 230 may input or output signals, data, or information. In some embodiments, the I/O 230 may enable a user interaction with the processing engine 140. In some embodiments, the I/O 230 may include an input device and an output device. Exemplary input device may include a keyboard, a mouse, a touch screen, a microphone, or the like, or a combination thereof. Exemplary output device may include a display device, a loudspeaker, a printer, a projector, or the like, or a combination thereof. Exemplary display device may include a liquid crystal display (LCD), a light-emitting diode (LED)-based display, a flat panel display, a curved screen, a television device, a cathode ray tube (CRT), or the like, or a combination thereof.

The communication port 240 may be connected to a network (e.g., the network 120) to facilitate data communications. The communication port 240 may establish connections between the processing engine 140 and the CT scanner 110, the terminal 130, or the storage 150. The connection may be a wired connection, a wireless connection, or combination of both that enables data transmission and reception. The wired connection may include electrical cable, optical cable, telephone wire, or the like, or any combination thereof. The wireless connection may include Bluetooth, Wi-Fi, WiMax, WLAN, ZigBee, mobile network (e.g., 3G, 4G, 5G, etc.), or the like, or a combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
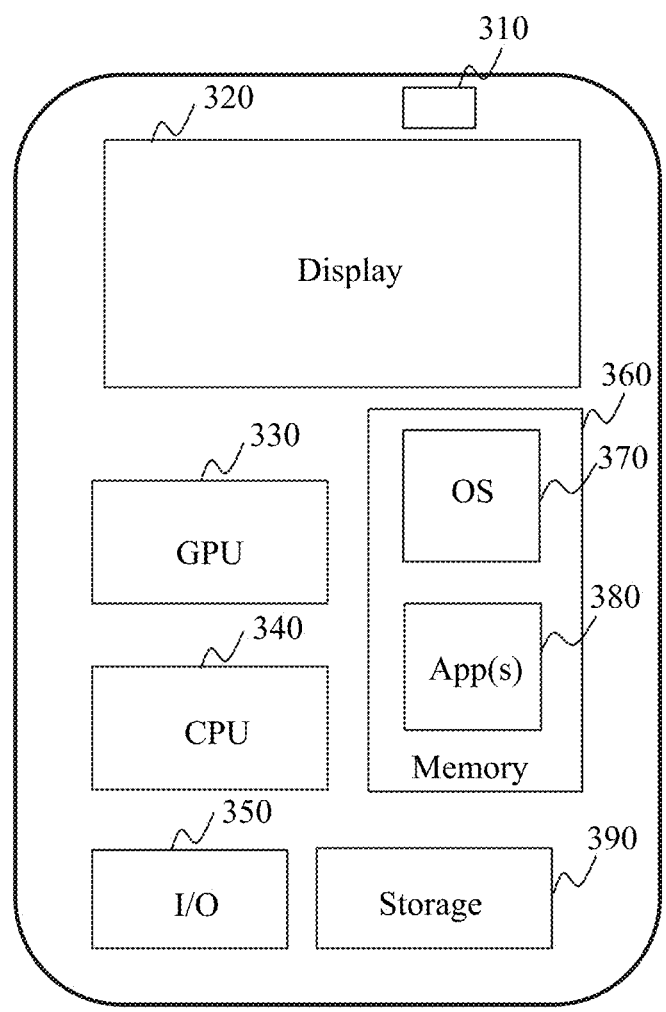
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device 300 on which the terminal 130 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS, Android, Windows Phone, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing engine 140. User interactions with the information stream may be achieved via the I/O 350 and provided to the processing engine 140 and/or other components of the CT system 100 via the network 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to the blood pressure monitoring as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 4:
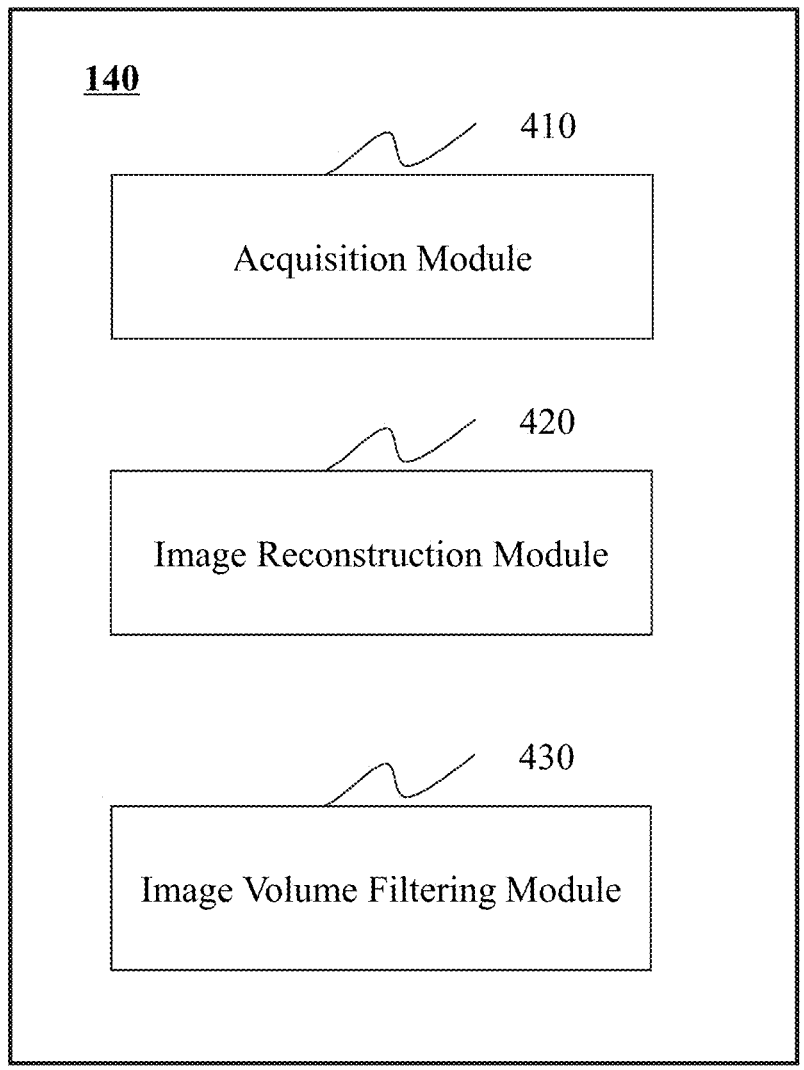
FIG. 4 is a schematic diagram illustrating an exemplary processor according to some embodiments of the present disclosure.

FIG. 4 is a schematic diagram illustrating an exemplary processing engine 140 according to some embodiments of the present disclosure. Processing engine 140 may process data obtained from or via CT scanner 110, processor 210, storage 220, input/output (I/O) 230, communication port 240, or the like, or any combination thereof. The data processed by processing engine 140 may include scanning data, reconstruction data, filtered data, image data (e.g., original image data), or the like, or any combination thereof. Processing engine 140 may perform operations including, for example, data preprocessing, image reconstruction, image correction, image composition, or the like, or any combination thereof. Processing engine 140 may reconstruct an image volume based on the scanning data obtained from CT scanner 110. Processing engine 140 may include an acquisition module 410, an image reconstruction module 420, and an image volume filtering module 430. Processing engine 140, or a portion thereof, may be implemented on the computing device 200 as illustrated in FIG. 2.

The acquisition module 410 may be configured to obtain scanning data of a subject. In some embodiments, the scanning data related to the subject may be obtained from a storage device in the CT system 100, such as the storage 150. The scanning data may be generated by at least one detector via a plurality of axial scans.

In some embodiments, the acquisition module 410 may be configured to obtain a scanning parameter related to the plurality of axial scans. In some embodiments, the scanning parameter related to the plurality of axial scans may be obtained from a storage device in the CT system 100, such as the storage 150. The scanning parameter related to the plurality of axial scans may include an amount of the plurality of axial scans, a subject table moving direction, a subject table position at an axial scan, a detector position at an axial scan, a detector pitch (e.g., detector size in z-direction at an iso-center), an amount of detectors in the detector row, or the like, or any combination thereof. In some embodiments, the scanning parameter may further include an overlap value. The overlap value may refer to a ratio of an overlap width in a z-direction at an iso-center of between two consecutive axial scans to the width of a signal axial scan in a z-direction at an iso-center. In some embodiments, the overlap value of two consecutive axial scans may be 10% of the total collimation.

The image reconstruction module 420 may generate an axial image or a stack of axial CT images representing anatomic information in three dimensions. An axial image may refer to an image in the axial plane. The image may be generated based on a reconstruction algorithm. Exemplary reconstruction algorithm may include a Fourier slice theorem algorithm, a filtered back projection (FBP) algorithm, a fan-beam reconstruction algorithm, an iterative reconstruction algorithm, an analytic reconstruction algorithm, an algorithm based on compressed sensing (CS), or the like, or any combination thereof.

The image volume filtering module 430 may be configured to correct the image volume generated by the image reconstruction module 420. The image volume filtering module 430 may modify an image in the image volume so as to reduce artifacts in an image reconstructed from the image volume. Detailed description of the image volume filtering module 430 may be found in FIG. 6, FIG. 7, FIG. 8, and the description thereof.

Figure 5A:
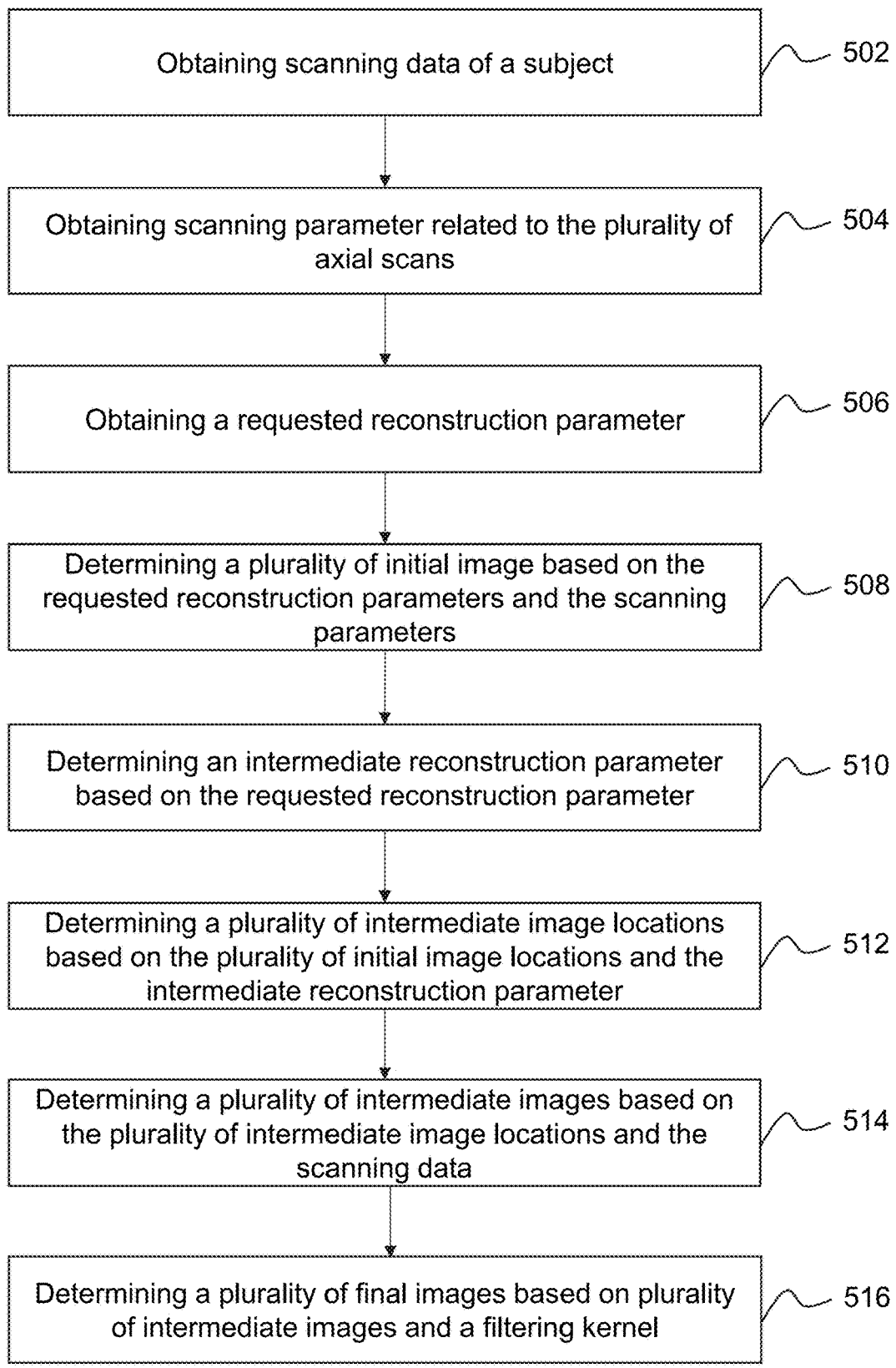
FIG. 5A is a flowchart of an exemplary process for processing image data according to some embodiments of the present disclosure.

FIG. 5A is a flowchart of an exemplary process for processing scanning data according to some embodiments of the present disclosure. In some embodiments, one or more operations of process 500 illustrated in FIG. 5A may be implemented in the CT system 100 illustrated in FIG. 1. For example, the process 500 illustrated in FIG. 5A may be stored in the storage 130 in the form of instructions, and invoked and/or executed by the processing device 120 (e.g., the processor 210 of the computing device 200 as illustrated in FIG. 2, the CPU 340 of the mobile device 300 as illustrated in FIG. 3).

At 502, scanning data of a subject may be obtained. The scanning data related to the subject may be obtained by the acquisition module 410. In some embodiments, the scanning data related to the subject may be obtained from a storage device in the CT system 100, such as the storage 150. The scanning data may be generated by at least one detector via a plurality of axial scans.

Figure 5B:
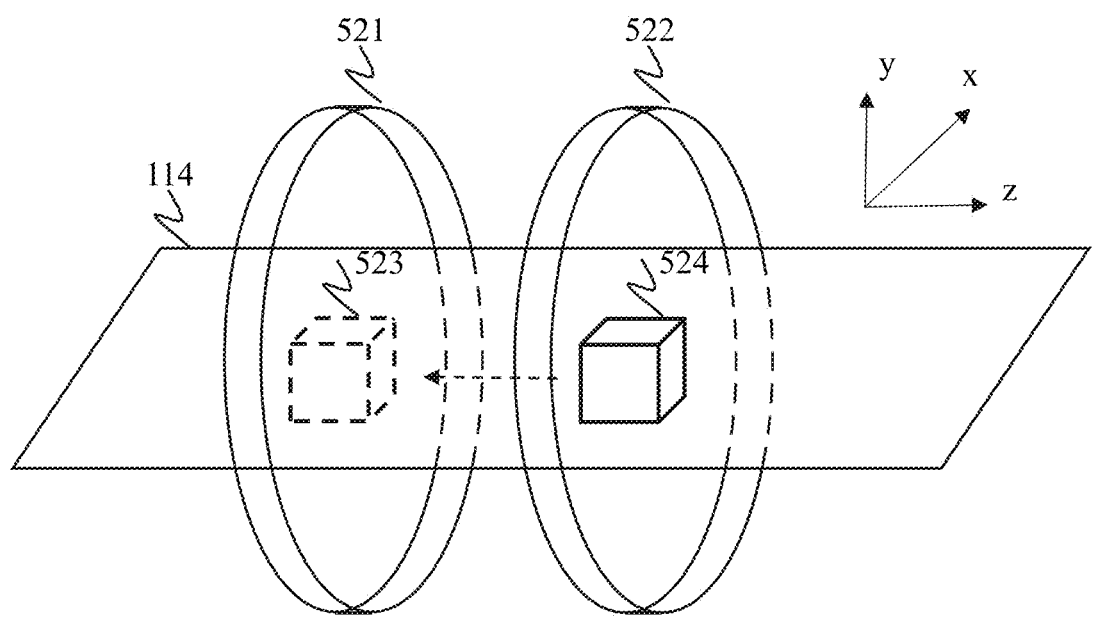
FIG. 5B is a schematic diagram illustrating exemplary axial scan according to some embodiments of the present disclosure.

The plurality of axial scans may be operated in a step-and-shoot way. FIG. 5B is a schematic diagram illustrating exemplary axial scan according to some embodiments of the present disclosure. As shown in FIG. 5B, a subject may be transported by a subject table to a first prescribed scanning location 524, then the subject may remain stationary at the first prescribed scanning location 524. A gantry carrying an x-ray tube and a detector may rotate a degree greater than 180 degrees (e.g., 360 degrees, 400 degrees, etc.) around an iso-center of the gantry to implement an axial scan 522 to acquire a complete set of projections at the first prescribed scanning location 524. Then the subject may be transported to a second prescribed scanning location 523, and the subject may remain stationary at the second prescribed scanning location 523. The gantry may rotate a degree greater than 180 degrees (e.g., 360 degrees, 400 degrees) to implement another axial scan 521 to acquire a complete set of projections at the second prescribed scanning location 523. The scanning data generated by the plurality of axial scans may be used to reconstruct sequential images for a stack.

In some embodiments, an axial scan may refer to a scan in the axial (or transverse) plane. As used herein, the axial plane may be perpendicular to the z-direction as shown in FIG. 5B. Since a gantry may carry more than one detectors arranged in row, a width of a volume formed by an axial scan in the z-direction at an iso-center may equal to a sum of detector pitches (e.g., detector size in z-direction at an iso-center) of all the detectors in row. In some embodiments, the axial scan may be performed on a portion (e.g., a head, a lung, an abdomen, a breast, a pleura, or the like) of a subject. An axial scan may be also referred as a shot in the present disclosure. Merely by way of example, the plurality of shots may be related to a plurality of cross-sectional images in the axial plane.

At 504, a scanning parameter related to the plurality of axial scans may be obtained. The scanning parameter related to the plurality of axial scans may be obtained by the acquisition module 410. In some embodiments, the scanning parameter related to the plurality of axial scans may be obtained from a storage device in the CT system 100, such as the storage 150.

The scanning parameter related to the plurality of axial scans may include an amount of the plurality of axial scans, a subject table moving direction, a subject table position at an axial scan, a detector position at an axial scan, a detector pitch (e.g., detector size in z-direction at an iso-center), an amount of detectors in the detector row, or the like, or any combination thereof. In some embodiments, the scanning parameter may further include an overlap value. The overlap value may refer to a ratio of an overlap width in a z-direction at an iso-center of between two consecutive axial scans to the width of a signal axial scan in a z-direction at an iso-center. In some embodiments, the overlap value of two consecutive axial scans may be 10% of the total collimation.

At 506, a requested reconstruction parameter may be obtained. The requested reconstruction parameter may be obtained via the acquisition module 410 or the input/output (I/O) 230. In some embodiments, the requested reconstruction parameter may be obtained from a storage device in the CT system 100, such as the storage 150.

A final image may refer to an image to be reconstructed based on the scanning data and the requested reconstruction parameter. In some embodiments, the requested reconstruction parameter may include a requested image increment, a requested image thickness, or the like, or any combination thereof. The requested image thickness may refer to nominal width of an image to be reconstructed along the z-direction. The z-direction may be parallel to moving direction of the subject table 114. A requested image increment may refer to a distance between two consecutive images to be reconstructed in terms of their positions in an image set (or an image volume). For instance, $J(:, :, :)$ may denote all images and/or pixels in a final image volume J, where the image volume J may include a plurality of final images. $J(:, :, k)$ may denote a certain final image k and/or all pixels of the final image k in the final image volume J. $J(x, y, k)$ may denote a certain pixel of the final image k in the final image volume J. The requested image thickness of the final image k may refer to a nominal width of the final image k along the z-direction. The requested image increment may refer to a distance between a final image k and a final image k+1.

According to the Nyquist sampling theorem, to achieve aliasing free imaging of a certain image thickness size using detectors with pitch of that same size, sampling rate may be two times higher (e.g., two times sampling per axial scan). To meet the criteria of the Nyquist sampling theorem, when the requested image thickness equals to the detector pitch, the scanning data may be acquired with axial deflection in detector pitch direction. For instance, the scanning data may be acquired with z-flying focal spot technique. Thus, to meet the criteria of the Nyquist sampling theorem, the requested image thickness may be any thickness not less than the detector pitch if the scanning data is acquired with an axial deflection. If the scanning data is acquired without an axial deflection, a ratio of the requested image thickness to the detector pitch may be not less than two.

At 508, a plurality of initial image locations may be determined based on the requested reconstruction parameters and the scanning parameters. An image location may propose a z-position of the final image to be reconstructed from the scanning data in the stack of the plurality of final images. For instance, an image volume J may include a plurality of images.

In some embodiments, to reconstruct images at the requested image increment $\Delta_i$ and the requested image thickness $\Delta_t$, the first image location $z_s$ must satisfy the following condition $$c_d \cdot z_s \geq c_d \cdot \left(z_{shot}(1) - \frac{d_p}{2} + \frac{\Delta_t}{2}\right), \tag{1}$$

where $$z_{shot}(j) = z_{center}(j) - c_d \cdot d_p \cdot (N_d - 1)/2, \tag{2}$$

$z_{center}(j)$ may denote the location of the subject table 114 at shot j. $N_d$ may denote the number of detector rows per shot. $z_{slot}(1)$ may represent the location of the first axial scan of the plurality of axial scans in the z-direction. $c_d$ may denote the moving direction of the subject table 114. $d_p$ may denote the detector pitch.

A plurality of initial image locations $z_{G_{11}}$ may be determined based on following equation:

$$z_{G_{11}}(k) = z_s + c_d \cdot \Delta_i \cdot (k-1), \tag{3}$$

k may denote an image index in the plurality of image locations. $z_{G_{11}}(k)$ may denote k-th location of the image in the z-direction. In some embodiments, the k goes from 1 to $N_i$, where the number of images $N_i$ must satisfy the following condition $$c_d \cdot z_{G_{11}}(N_i) \leq c_d \cdot \left(z_{shot}(N_s) + d_p(N_i - 1) + \frac{d_p}{2} - \frac{\Delta_t}{2}\right), \tag{4}$$

$N_i$ may denote an amount of the plurality of final images, $z_{shot}(j)$ may denote the first detector position for shot j (e.g., the j-th axial scan of the plurality of the axial scans). j may range from 1 to $N_s$, where $N_s$ may denote the amount of the plurality of the axial scans.

At 510, an intermediate reconstruction parameter may be determined based on the requested reconstruction parameter.

Figure 9A:
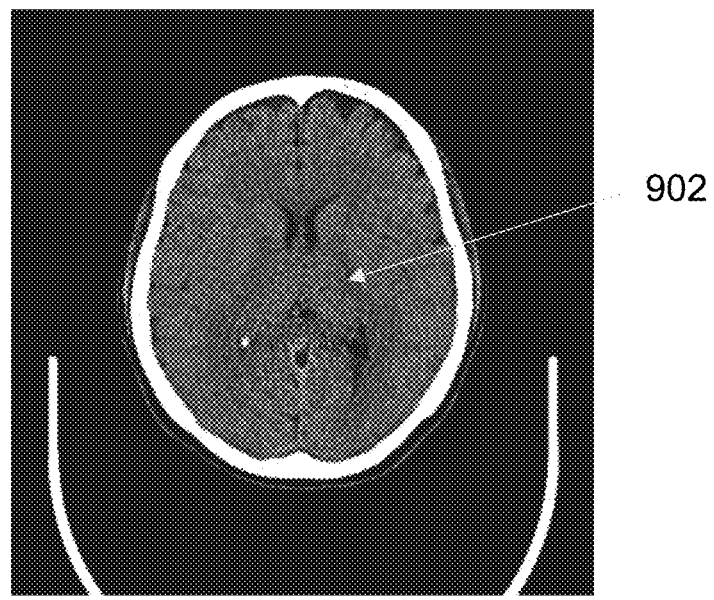
FIG. 9A is an original reconstructed image and FIG. 9B is a new reconstructed image generated by performing a reconstructing and filtering process disclosed herein on original scanning data related to the original reconstructed image illustrated in FIG. 9A according to some embodiments of the present disclosure.
Figure 9B:
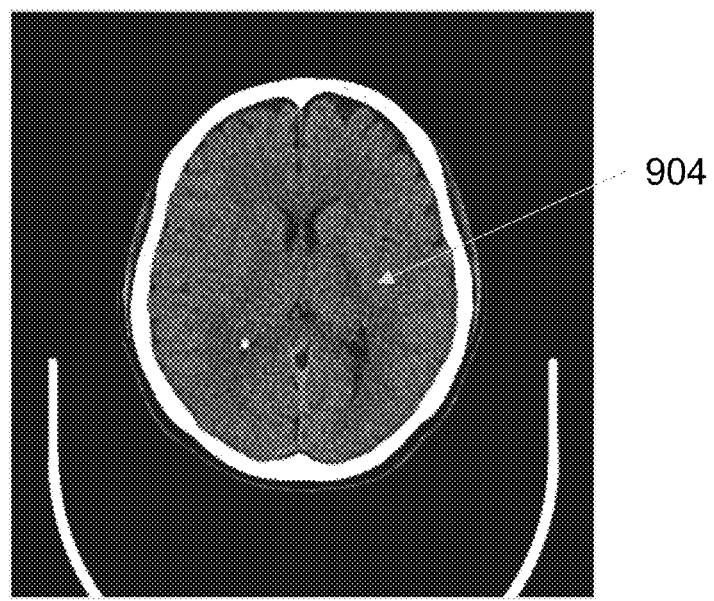

Based on the plurality of initial image locations, a plurality of images with requested image increment and requested image thickness may be reconstructed. However, due to data inconsistencies of the scanning data introduced by projection in the z-direction, some artifacts (e.g., pinwheel artifact as shown in FIG. 9A and overshoot artifacts as shown in FIG. 9B) may exist in such images. To avoid the artifacts, a plurality of intermediate images reconstructed on denser locations may be determined based on the requested reconstruction parameters and performed scan parameters. Certain number of intermediate images may be fused to form a final image to overcome the inconsistencies of the scanning data In some embodiments, the intermediate reconstruction parameter may include an intermediate image increment, an intermediate image thickness, or the like, or any combination thereof.

In some embodiments, the image reconstruction module 420 may determine that whether the scanning data is acquired with axial deflection. After the image reconstruction module 420 determines the scanning data is acquired with axial deflection, the image reconstruction module 420 may further determine whether the requested image thickness exceeds the detector pitch. If the requested image thickness exceeds the detector pitch, the image reconstruction module 420 may determine the intermediate image increment based on the requested image increment and the detector pitch. In some embodiments, the image reconstruction module 420 may determine an intermediate image increment as $\Delta_{i1}$ and an intermediate image thickness as $\Delta_{t1}$ based on the following equations respectively, $$\Delta_{i1} = \Delta_i / \text{ceil}(\Delta_i / d_p), \tag{5}$$

$$\Delta_{t1} = d_p, \tag{6}$$

$\Delta_i$ may denote the requested image increment, and the function of ceil ( ) may return an integer that is closest to the number in ( ) and equal to or greater than the number. For example, ceil (12)=12. For another example, ceil (12.3)=13.

In some embodiments, after image reconstruction module 420 determines the scanning data is acquired with the axial deflection, the image reconstruction module 420 may further determine whether the requested image thickness equals the detector pitch. If the requested image thickness equals the detector pitch, the image reconstruction module 420 may determine the intermediate image increment only based on the requested image increment. When requested image thickness equals the detector pitch the image reconstruction module 420 may determine an intermediate image increment as $\Delta_{i1}$ and an intermediate image thickness as $\Delta_{t1}$ based on the following equations respectively, $$\Delta_{i1} = \Delta_i / 3, \tag{7}$$

and, $$\Delta_{t1} = d_p. \tag{8}$$

In some embodiments, the image reconstruction module 420 may determine whether the scanning data is acquired without the axial deflection. After the image reconstruction module 420 determines the scanning data is acquired without the axial deflection, the image reconstruction module 420 may further determine whether a ratio of the requested image thickness to the detector size of the at least one detector is not less than two. If the image reconstruction module 420 determines that the ratio of the requested image thickness to the detector size of the at least one detector is not less than two, the image reconstruction module 420 may determine the intermediate image increment based on the requested image increment and the detector pitch. In some embodiments, the image reconstruction module 420 may determine an intermediate image increment as $\Delta_{i1}$ and an intermediate image thickness as $\Delta_{t1}$ based on the Equations (5) and (6) respectively.

At 512, a plurality of intermediate image locations may be determined based on the plurality of initial image locations and the intermediate reconstruction parameter. In some embodiments, the image reconstruction module 420 may further determine the plurality of intermediate grids based on a broadening size parameter. An amount of the plurality of intermediate image locations is related to the broadening size parameter. In some embodiments, a ratio of an amount of the plurality of intermediate image locations to an amount of the plurality of initial grids may equal to the broadening size parameter.

The image reconstruction module 420 may determine the broadening size parameter based on whether the scanning data is acquired with axial deflection and a ratio of the requested image thickness to the detector pitch. If the scanning data is acquired with axial deflection and the requested image thickness exceeds the detector size of the at least one detector (e.g., a detector pitch), the image reconstruction module 420 may determine the broadening size parameter based on the requested image thickness and the intermediate image increment. If the scanning data is acquired with axial deflection and the requested image thickness equals to the detector size of the at least one detector, the plurality of intermediate image locations is three times as dense as the requested locations, and the intermediate image increment is as the requested image increment divided by three. If the scanning data is acquired without axial deflection the ratio of the requested image thickness to the detector size of the at least one detector is not less than two, the image reconstruction module 420 may determine the broadening size parameter based on the requested image thickness and the intermediate image increment. Detailed description of the plurality of intermediate image locations generation may be found in FIG. 6, FIG. 7, FIG. 8, and the description thereof.

At 514, a plurality of intermediate images may be determined based on the plurality of intermediate image locations and the scanning data. The image reconstruction module 420 may reconstruct the intermediate images reconstructed based on the plurality of intermediate image locations and the scanning data. Exemplary reconstruction technique may include a Fourier slice theorem technique, a filtered back projection (FBP) technique, a fan-beam reconstruction technique, an iterative reconstruction technique, an analytic reconstruction technique, a technique based on compressed sensing (CS), or the like, or any combination thereof. Detailed description of the plurality of intermediate image locations generation may be found in FIG. 6, FIG. 7, FIG. 8, and the description thereof.

At 516, a plurality of final images may be determined based on plurality of intermediate images and a filtering kernel by the image volume filtering module 430. In some embodiments, since a ratio of an amount of the plurality of intermediate image locations to an amount of the plurality of initial grids may equal to the broadening size parameter, a ratio of an amount of the plurality of intermediate images to an amount of the plurality of final images may equal to the broadening size parameter. The plurality of final images may be determined with the requested image thickness and the requested image increment. Detailed description of the plurality of intermediate image locations generation may be found in FIG. 6, FIG. 7 and the description thereof.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, operations 514 and 516 may be performed simultaneously.

Figure 6:
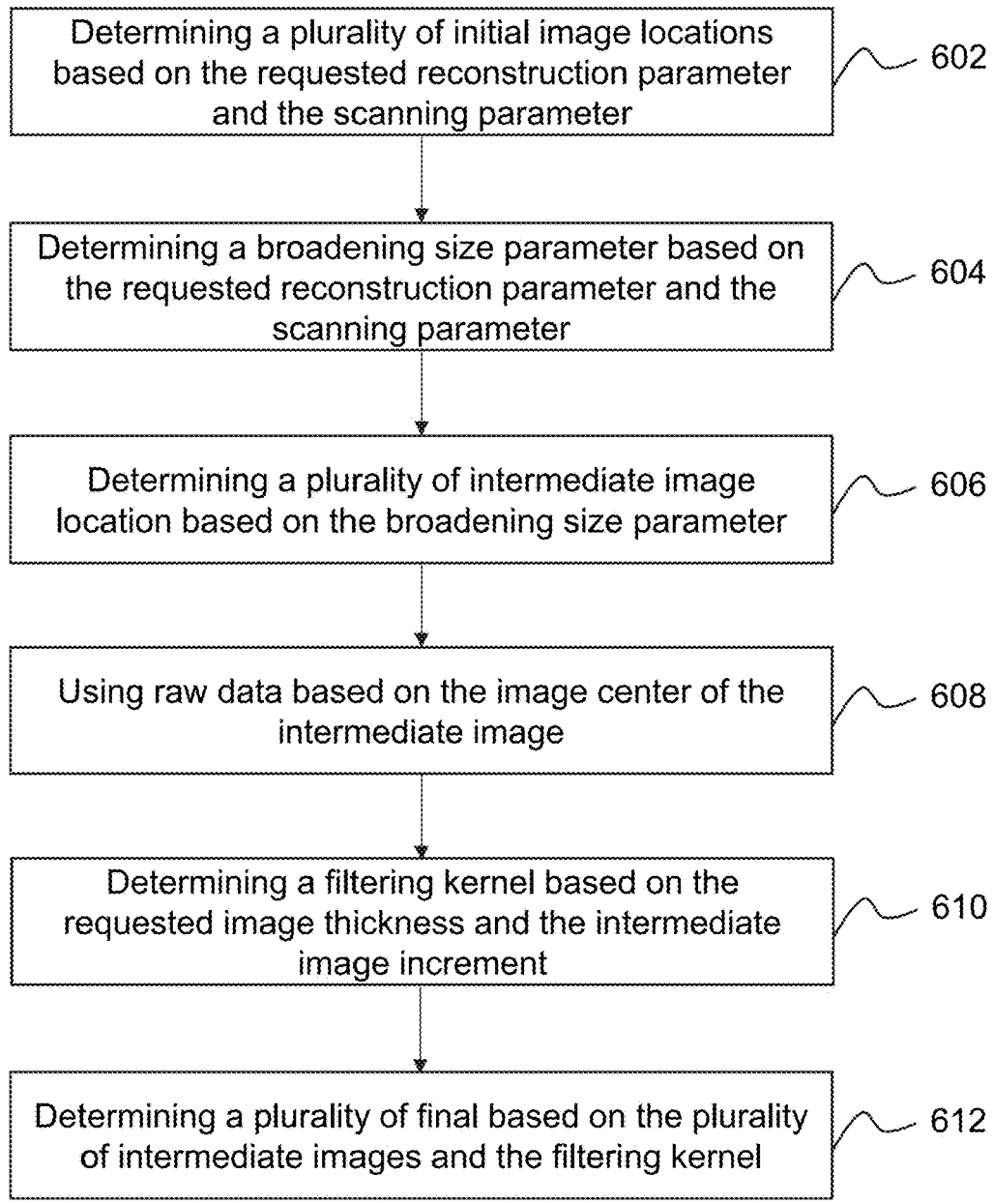
FIG. 6 is a flowchart of an exemplary process for processing scanning data acquired with axial deflection when the requested image thickness exceeds the detector size of the at least one detector according to some embodiments of the present disclosure.

FIG. 6 is a flowchart of an exemplary process for processing scanning data acquired with axial deflection when the requested image thickness exceeds the detector size of the at least one detector according to some embodiments of the present disclosure. In some embodiments, one or more operations of process 600 illustrated in FIG. 6 may be implemented in the CT system 100 illustrated in FIG. 1. For example, the process 600 illustrated in FIG. 6 may be stored in the storage 130 in the form of instructions, and invoked and/or executed by the processing device 120 (e.g., the processor 210 of the computing device 200 as illustrated in FIG. 2, the CPU 340 of the mobile device 300 as illustrated in FIG. 3). Operations 508 to 516 as described in FIG. 5 may be performed according to process 600 when the scanning data is acquired with axial deflection and the requested image thickness exceeds the detector size of the at least one detector, or when the scanning data is acquired with axial deflection and a ratio of the requested image thickness to the detector size of the at least one detector exceeds two.

At 602, a plurality of initial image locations may be determined based on the requested reconstruction parameter and the scanning parameter by the image reconstruction module 420. The plurality of initial image locations $z_{G_{11}}$ may be determined based on Equations (1), (2), (3), and (4). Detailed description of the plurality of image location generation may be found in FIG. 5 and the description thereof.

At 604, a broadening size parameter may be determined based on the requested reconstruction parameter and the scanning parameter. If the scanning data is acquired with axial deflection and the requested image thickness exceeds the detector size of the at least one detector (e.g., a detector pitch), the image reconstruction module 420 may determine the broadening size parameter based on the requested image thickness and the intermediate image increment. In some embodiments, the image reconstruction module 420 may determine the broadening size parameter $N_{k2}$ based on the following equation, $$N_{k2} = \begin{cases} \text{floor}(\Delta_t/\Delta_{i1}), & \text{if } d_p + \Delta_{i1} \cdot (\text{floor}(\Delta_t/\Delta_{i1}) - 1) \geq \Delta_t, \\ \text{floor}(\Delta_t/\Delta_{i1}) + 1, & \text{otherwise} \end{cases} \quad (9)$$

The function of floor ( ) may return an inter that is closest to the number in ( ) and equal to or smaller than the number. For example, floor (12)=12. For another example, floor (12.3)=12.

At 606, a plurality of intermediate image location may be determined based on the broadening size parameter by the image reconstruction module 420. The image reconstruction module 420 may determine the plurality of intermediate image locations $z_{G_{01}}$ on a denser grid than the requested one, based on the following equation:

$$z_{G_{01}}(k) = z_s + c_d \cdot \Delta_{i1} \cdot \left(k - 1 - \frac{N_{k2} - 1}{2}\right), \quad (10)$$

$$k \in \{1, \ldots, N_{k2} \cdot N_i\},$$

where $z_{G_{01}}(k)$ may denote a location of the dense grid k in the z-direction. The amount of intermediate image locations may be $N_{k2}$ times of the amount the amount of images in the requested image locations $z_{G_{11}}$.

At 608, reconstruction software shall use raw data based on the image center of the intermediate image. More precisely, suppose $z_{mid}(j)$, $j \in \{1, \ldots, N_s+1\}$ are middle points between the shots:

$$z_{mid}(j) = \begin{cases} z_{shot}(1), & \text{if } j = 1, \\ (z_{center}(j) + z_{center}(j-1))/2, & \text{if } j = 2, \ldots, N_s, \\ z_{G11}(N_i), & \text{if } j = N_s + 1, \end{cases} \quad (11)$$

If image location $z_{G_{01}}(k)$ belongs to the interval $[z_{mid}(j_0), z_{mid}(j_0+1))$ for some shot number $j_0 \in \{1, \ldots, N_s\}$, then image at location $z_{G_{01}}(k)$ shall be reconstructed with data from the shot $j_0$.

At 610, a filtering kernel may be determined based on the requested image thickness and the intermediate image increment by the image volume filtering module 430.

In some embodiments, the filtering kernel may be determined based on a ratio of the requested image thickness to the intermediate image increment, wherein $$f_{ker0}=[\epsilon,1,\ldots,1,\epsilon] \quad (12)$$

and $$\epsilon = \frac{1}{2} - \frac{(N_{k2}-1)\cdot\Delta_{i1}-\Delta_t}{2d_p}, \quad (13)$$

$f_{ker0}$ may denote the broadening image kernel, the amount of the repeated values of 1 is $N_{k2}-2$.

At 612, a plurality of final images may be determined based on the plurality of intermediate images and the filtering kernel by the image volume filtering module 430. In some embodiments, a final image volume $J_0$ may be generated by filtering a stack of images $I_0(:,:,:)$ using the filtering kernel determined in 610. The final image volume $J_0$ may be expressed as:

$$J_0(:,:,l) = \frac{1}{2\epsilon+N_{k2}-2}\sum_{m=1:N_{k2}} f_{ker0}(m)\cdot I_0(:,:,m+\Delta_i/\Delta_{i1}\cdot(l-1)). \quad (14)$$

l may denote the index of images in the image volume $J_0$, which may range from 1 to $N_i$. The final image volume $J_0$ may include the plurality of final images with the requested image thickness and the requested image increment.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, operations 610 and 612 may be performed simultaneously.

Figure 7:
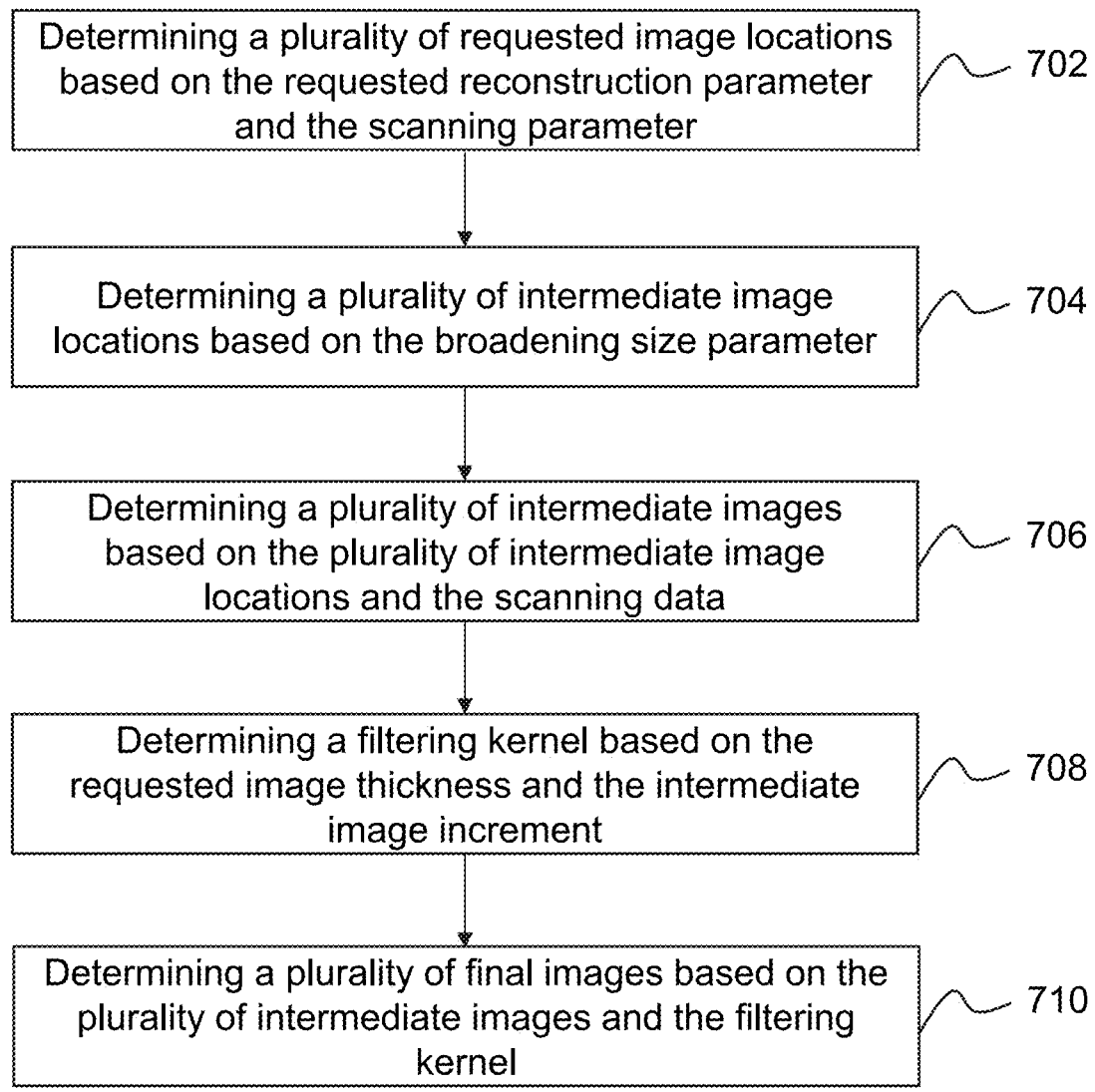
FIG. 7 is a flowchart of an exemplary process for processing scanning data acquired with axial deflection when the requested image thickness equals the detector size of the at least one detector according to some embodiments of the present disclosure.

FIG. 7 is a flowchart of an exemplary process for processing scanning data acquired with axial deflection when the requested image thickness equals the detector size of the at least one detector according to some embodiments of the present disclosure. In some embodiments, one or more operations of process 700 illustrated in FIG. 7 may be implemented in the CT system 100 illustrated in FIG. 1. For example, the process 700 illustrated in FIG. 5 may be stored in the storage 130 in the form of instructions, and invoked and/or executed by the processing device 120 (e.g., the processor 210 of the computing device 200 as illustrated in FIG. 2, the CPU 340 of the mobile device 300 as illustrated in FIG. 3). Operations 508 to 516 as described in FIG. 5 may be performed according to process 700 when the scanning data is acquired with axial deflection and the requested image thickness equals the detector size of the at least one detector.

At 702, a plurality of requested image locations may be determined based on the requested reconstruction parameter and the scanning parameter by the image reconstruction module 420. The plurality of requested image locations $z_{G_{11}}$ may be determined based on Equation (1), (2), (3), and (4). Detailed description of the plurality of the image location generation may be found in FIG. 5 and the description thereof.

At 704, a plurality of intermediate image locations may be determined based on the broadening size parameter by the image reconstruction module 420. The image reconstruction module 420 may determine the plurality of intermediate image locations $z_{G_{02}}$ based on the following equation:

$$z_{G_{02}}(k)=z_s+c_d\cdot\Delta_i\cdot(k-2)/3, k\in\{1,\ldots,3\cdot N_i\} \quad (15)$$

At 706, a plurality of intermediate images may be determined based on the plurality of intermediate image locations and the scanning data by the image reconstruction module 420. The image reconstruction module 420 may use raw data based on the image center of the intermediate image. For example, if image location $z_{G_{01}}(k)$ belongs to the interval $[z_{mid}(j_0), z_{mid}(j_0+1))$ for some shot number $j_0\in\{1,\ldots,N_s\}$, then image at location $z_{G_{01}}(k)$ may be reconstructed with data from the shot $j_0$.

The image reconstruction module 420 may determine an intermediate image volume $I_1(:,:,:)$ including the plurality of intermediate image locations.

At 708, a filtering kernel may be determined based on the requested image thickness and the intermediate image increment by the image volume filtering module 430.

The filtering kernel may be a three point high-pass filtering kernel configured to enhance slice sensitivity profile (SSP) in the image volume when the scanning data is acquired with axial deflection and the requested image thickness equals to the detector pitch. For example, a three point high-pass filtering kernel $f_{ker2}$ may be expressed as:

$$f_{ker2}=[-1,3,-1], \quad (16)$$

In some embodiments, the filtering kernel may be determined by the image volume filtering module 430 based on $f_{ker2}$ and an image increment ratio. The image increment ratio $f_i$ may be determined based on the requested image increment and the detector pitch, wherein $$f_i=d_p/\Delta_i. \quad (17)$$

The filtering kernel may be determined based on $f_{ker2}$ and $f_i$, if $f_i$ is an integer, where $$f_{ker3}=[f_{ker2}(1),0,\ldots,0,f_{ker2}(2),0,\ldots,0,f_{ker2}(3)], \text{if } f_i \text{ is integer.} \quad (18)$$

In Equation (18), the number of repeated zeros may be $f_i-1$. For example, $f_{ker3}$ may be $[-1,3,-1]$ when $f_i=1$. For another example, $f_{ker3}$ may be $[-1,0,3,0,-1]$ when $f_i=2$. As still another example, $f_{ker3}$ may be $[-1,0,0,3,0,0,-1]$ when $f_i=3$.

If $f_i$ is not an integer, the filtering kernel may be determined based on the following equation, $$f_{ker3}=([0,0,f_{ker2}(1),0,\ldots,0,f_{ker2}(2),0,\ldots,0,f_{ker2}(3),0,0]\cdot(\text{ceil}(f_i)-f_i)+[f_{ker2}(1),0,\ldots,0,f_{ker2}(2),0,\ldots,0,f_{ker2}(3)]\cdot(f_i-\text{floor}(f_i)) \quad (19)$$

In Equation (19), the number of repeated zeros between $f_{ker2}(1)$ and $f_{ker2}(2)$ in the first bracket may be floor($f_i$)−1, the number of repeated Os in the second bracket may be ceil($f_i$)−1.

At 710, a plurality of final images may be determined based on the plurality of intermediate images and the filtering kernel by the image volume filtering module 430. In some embodiments, a final image volume $J_1$ may be generated by filtering a stack of images $I_1(:,:,:)$ using the filtering kernel determined in 710. The final image volume $J_1$ may be expressed as:

$$J_1(:,:,l)=\Sigma_{m=1:N_k}f_{ker3}(m)\cdot I_1(:,:,m+3l-(N_k-1)/2-2), \quad (20)$$

$N_k$ is the number of elements in $f_{ker3}$, l may denote the index of images in the image volume $J_1$, which may range from 1 to $N_i$. The final image volume $J_1$ may include the plurality of final images with requested image thickness and image increment.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, operations 708 and 710 may be performed simultaneously.

Figure 8:
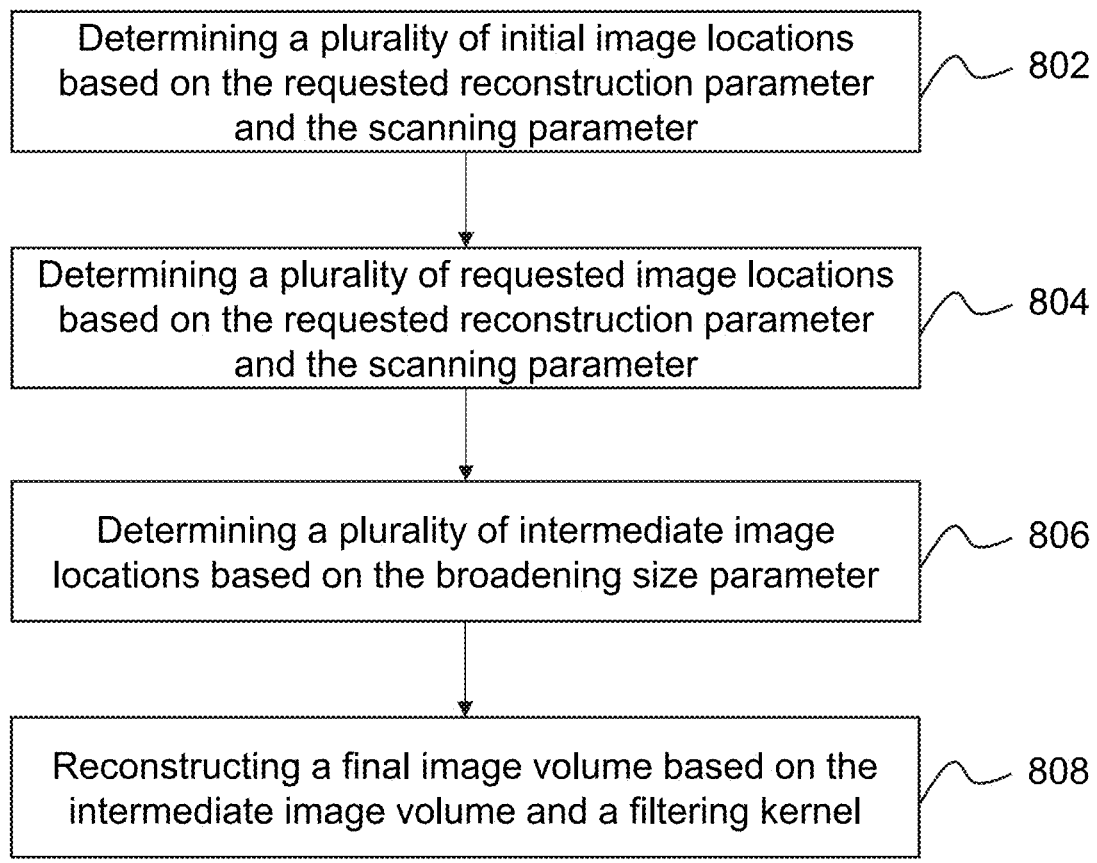
FIG. 8 is a flowchart of an exemplary process for processing scanning data acquired without axial deflection when a ratio of the requested image thickness to detector size of the at least one detector is less than two according to some embodiments of the present disclosure.

FIG. 8 is a flowchart of an exemplary process for processing scanning data acquired without axial deflection when the requested image thickness equals the detector size of the at least one detector according to some embodiments of the present disclosure. In some embodiments, one or more operations of process 800 illustrated in FIG. 8 may be implemented in the CT system 100 illustrated in FIG. 1. For example, the process 800 illustrated in FIG. 8 may be stored in the storage 130 in the form of instructions, and invoked and/or executed by the processing device 120 (e.g., the processor 210 of the computing device 200 as illustrated in FIG. 2, the CPU 340 of the mobile device 300 as illustrated in FIG. 3).

At 802, a plurality of initial image locations may be determined based on the requested reconstruction parameter and the scanning parameter.

For the scanning data acquired without axial deflection, and a ratio of the requested image thickness to the detector size of the at least one detector is not less than two, acquired scanning data with z-direction sampling are not sufficient to produce a diagnostic image in good quality at an arbitrary location. Image reconstruction is recommended to be done only at locations in which sampling deficiencies are uniformly distributed. Reconstruction at image locations parallel to the detector boundaries may be avoided by using the recommended reconstruction locations. The recommended reconstruction locations may be determined by restricting the value of the requested image increment, which strongly depends on detector pitch. For example, only two values of the requested image increment $\Delta_i$ are recommended, where $$\Delta_i = d_p \text{ or } \Delta_i = \frac{d_p}{2}.$$

To fully utilize the available sampling in the existing axial scan for most of the pixels within image and minimize the aliasing artifacts, the values of the starting image position $z_s$ may only take the following discrete values:

$$z_s \in \left\{ \Delta_i \cdot \left( i - 1 - \frac{(N_0 - 1)}{2} \right) + z_{center}(j), \quad (21)\right.$$
$$\left. \text{with } j = 1, \ldots, N_s, i = 1, \ldots, N_0 \right\}$$

When $\Delta_i = d_p$, the number of images generated per shot is $N_0 = N_d$, where $N_d$ may denote the number of detector rows per shot. For another example, when $$\Delta_i = \frac{d_p}{2},$$

the number of images generated per shot is $N_0 = 2N_d$.

An overlap value between two consecutive axial scans of a plurality of axial scans may be determined. The overlap value may be determined by the image reconstruction module 420. To ensure the continuity between shots, and minimize the edge shading artifacts, the following overlap value $s_0$ between the axial scans is recommended:

$$s_0 = 2d_p \text{ceil}\left( \sigma \cdot \frac{N_d}{2} \right), \quad (22)$$

where $\sigma$ may range from 0 to 1. For example, $\sigma$ may be 10%. The overlap value features division and multiplication by 2 to ensure that a ratio of the overlap value $s_0$ to the detector size is an even number. $N_d$ may denote the number of detector rows per shot.

A total amount of images proposed to be reconstructed may be determined based on the overlap value. The image reconstruction module 420 may determine the total amount of images to be reconstructed $N_i$ based on following equation, $$N_i = \frac{s_0}{\Delta_i} + \left( N_d - \frac{s_0}{\Delta_i} \right) N_s. \quad (23),$$

where $N_s$ may denote the amount of the plurality of the axial scans.

At 804, a plurality of requested image locations may be determined based on the requested reconstruction parameter and the scanning parameter by the image reconstruction module 420. The plurality of requested image locations $z_{G_{11}}$ may be determined based on Equation (1), (2), (3), and (4). Detailed description of the plurality of image location generation may be found in FIG. 5 and the description thereof.

At 806, a plurality of intermediate image locations may be determined based on the broadening size parameter by the image reconstruction module 420. The image reconstruction module 420 may determine the plurality of intermediate image locations $z_{G_{02}}$ based on the Equation (15).

The image reconstruction module 420 may use raw data based on the image center of the intermediate image. More precisely, if image location $z_{G_{01}}(k)$ belongs to the interval $[z_{mid}(j_0), z_{mid}(j_0+1))$ for some shot number $j_0 \in \{1, \ldots, N_s\}$, then image at location $z_{G_{01}}(k)$ shall be reconstructed with data from the shot $j_0$.

The image reconstruction module 420 may determine an intermediate image volume $I_1$ (:, :, :) including the plurality of intermediate image locations.

At 808, a final image volume may be reconstructed based on the intermediate image volume and a filtering kernel. The image volume may be reconstructed by the image volume filtering module 430. The filtering kernel may be a convolution of two kernels (e.g., an enhancing filter, a box filter). The filtering kernel may be configured to reduce aliasing artifacts which are common in axial reconstruction beyond the limit given by the Nyquist sampling theory.

If the requested image increment is $\Delta_i = d_p$, and if the requested image thickness to the detector pitch equals to 1, a filter as following may be used:

$$f_{ker61} = \frac{[-1, 2, 1, 2, -1]}{3}$$

If the requested image increment is $\Delta_i = d_p$, and if the ratio of the requested image thickness to the detector pitch equals to 5/3, a filter as following may be used:

$$f_{ker62} = \frac{[-1, 2, 1, 1, 1, 2, -1]}{5}$$

If the requested image increment is $\Delta_i = d_p$, and if the ratio of the requested image thickness to the detector pitch equals to 2, a filter as following may be used:

$$f_{ker63} = \frac{[0.5, 1, 1, 1, 1, 1, 0.5]}{6}$$

If the requested image increment is $\Delta_i = d_p$, for other values of the ration between the requested image thickness to the detector pitch, the filter may be determined as linear interpolation of kernels in $f_{ker61}$, $f_{ker62}$, and $f_{ker63}$.

If the requested image increment is $\Delta_i = d_p/2$, and if the requested image thickness to the detector pitch equals to 1, a filter as following may be used:

$$f_{ker64} = \frac{[-1, 0, 2, 0, 1, 0, 2, 0, -1]}{3}$$

If the requested image increment is $\Delta_i = d_p/2$, and if the ratio of the requested image thickness to the detector pitch equals to 5/3, a filter as following may be used:

$$f_{ker65} = \frac{[-1, 0, 2, 0, 1, 0, 1, 0, 1, 0, 2, 0, -1]}{5}$$

If the requested image increment is $\Delta_i = d_p/2$, and if the ratio of the requested image thickness to the detector pitch equals to 2, a filter as following may be used:

$$f_{ker66} = \frac{[0.5, 0, 1, 0, 1, 0, 1, 0, 1, 0, 1, 0, 0.5]}{6}$$

If the requested image increment is $\Delta_i = d_p/2$, for other values of the ration between the requested image thickness to the detector pitch, the filter may be determined as linear interpolation of kernels in $f_{ker64}$, $f_{ker65}$, and $f_{ker66}$.

In some embodiments, an image volume $J_2$ may be generated by filtering a stack of images $I_2$ using the filtering kernel $f_{ker6}$ (e.g., $f_{ker61}$, $f_{ker62}$, $f_{ker63}$, $f_{ker64}$, $f_{ker65}$, $f_{ker66}$, etc.) The image volume $J_2$ may be expressed as:

$$J_2(:,:,l) = \Sigma_{m=1:N_k} f_{ker6}(k) \cdot I_2(:,:,j,m+3l-(N_k-1)/2-2), \quad (24)$$

l may denote the index of images in the image volume $J_2 = 1 \ldots N_i$ and $N_k$ is the number of elements in $f_{ker6}$.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, operations 804 and 806 may be performed simultaneously.

The following examples are provided for illustration purposes, and not intended to limit the scope of the present disclosure.

FIG. 9A is an original reconstructed image and FIG. 9B is a new reconstructed image generated by performing a reconstructing and filtering process disclosed herein on original scanning data related to the original reconstructed image illustrated in FIG. 9A according to some embodiments of the present disclosure. Compared to 902 of FIG. 9A, the pinwheel artifact at 904 of FIG. 9B was reduced.

Figure 10A:
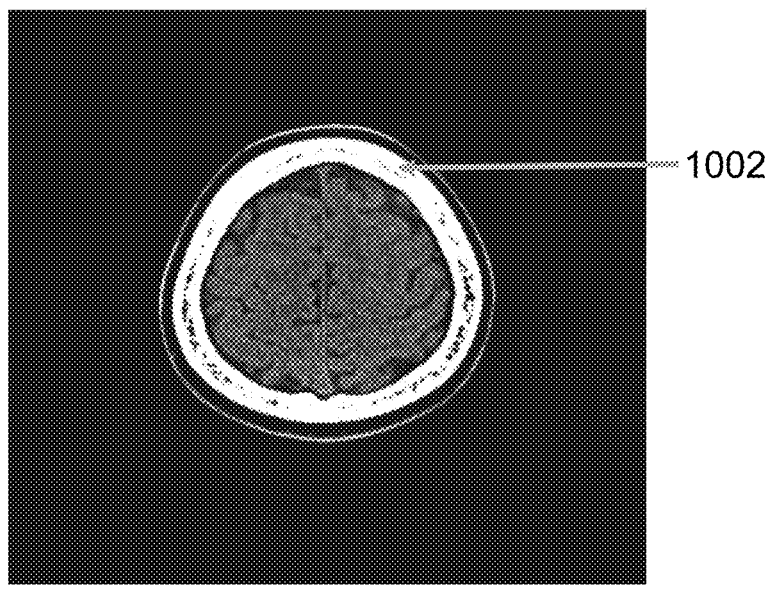
FIG. 10A is an original reconstructed image and FIG. 10B is a new reconstructed image generated by performing a reconstructing and filtering process disclosed herein on original scanning data related to the original reconstructed image illustrated in FIG. 10A according to some embodiments of the present disclosure.
Figure 10B:
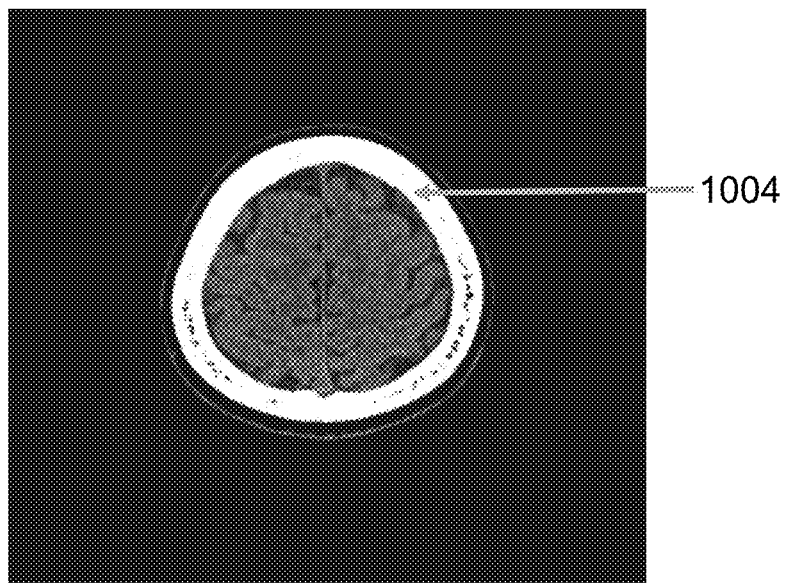

FIG. 10A is an original reconstructed image and FIG. 10B is a new reconstructed image generated by performing a reconstructing and filtering process disclosed herein on original scanning data related to the original reconstructed image illustrated in FIG. 10A according to some embodiments of the present disclosure. Compared to 1002 of FIG. 10A, the overshoots caused by enhancing row filter results at 1004 of FIG. 10B was reduced.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A non-transitory computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

I claim:

1. A system for reconstructing CT images, comprising:
at least one storage medium including a set of instructions; and
at least one processor configured to communicate with the at least one storage medium, wherein when executing the set of instructions, the system is configured to:
obtain scanning data of a subject, wherein the scanning data is generated by at least one detector via a plurality of axial scans;
obtain a scanning parameter, wherein the scanning parameter includes a detector size of the at least one detector;
obtain a requested reconstruction parameter, wherein the requested reconstruction parameter includes a requested image increment and a requested image thickness;
determine a plurality of initial image locations based on the scanning parameter and the requested reconstruction parameter;
determine an intermediate reconstruction parameter based on the requested reconstruction parameter, wherein the intermediate reconstruction parameter includes an intermediate image increment and an intermediate image thickness;
determine a plurality of intermediate image locations based on the requested reconstruction parameters and the intermediate reconstruction parameter, wherein an amount of the plurality of intermediate image locations is larger than an amount of the plurality of initial image locations;
determine a plurality of intermediate images based on the plurality of image locations and the scanning data; and
determine a plurality of final images based on plurality of intermediate images and a filtering kernel.

2. The system of claim 1, wherein the system is further directed to:
  determine a broadening size parameter based on the requested reconstruction parameter and the scanning parameter; and
  determine the plurality of intermediate image locations based on the broadening size parameter, wherein the amount of the plurality of intermediate image locations is related to the broadening size parameter.

3. The system of claim 2, wherein the intermediate image thickness equals to the detector size.

4. The system of claim 2, wherein to determine the broadening size parameter based on the requested reconstruction parameter and the scanning parameter, the system is further directed to:
  determine whether the scanning data is acquired with axial deflection; and
  in response to a determination that the scanning data is acquired with axial deflection, determine whether the requested image thickness exceeds the detector size;
    in response to a determination that the requested image thickness exceeds the detector size,
      determine the intermediate image increment based on the requested image increment and the detector size; and
      determine the broadening size parameter based on the requested image thickness and the intermediate image increment.

5. The system of claim 4, wherein the system is further directed to:
  determine the filtering kernel based on a ratio of the requested image thickness to the intermediate image increment.

6. The system of claim 2, wherein the system is further directed to:
  determine whether the scanning data is acquired with axial deflection; and
  in response to a determination that the scanning data is acquired with axial deflection, determine whether the requested image thickness equals to the detector size;
    in response to a determination that the requested image thickness equals to the detector size,
      determine the intermediate image increment as the requested image increment divided by three.

7. The system of claim 6, wherein the system is further directed to:
  determine the filtering kernel based on a ratio of the detector size to the requested image increment.

8. The system of claim 2, wherein to determine the broadening size parameter based on the requested reconstruction parameter and the scanning parameter, the system is further directed to:
  determine whether the scanning data is acquired with axial deflection; and
  in response to a determination that the scanning data is acquired without axial deflection,
    determine whether a ratio of the requested image thickness to the detector size is not less than two;
    in response to a determination that the ratio of the requested image thickness to the detector size is not less than two,
      determine the intermediate image increment based on the requested image increment and the detector size; and
      determine the broadening size parameter based on the requested image thickness and the intermediate image increment.

9. The system of claim 1, wherein the system is further directed to:
  determine whether the scanning data is acquired with axial deflection; and
  in response to a determination that the scanning data is acquired without axial deflection,
    determine whether the ratio of the requested image thickness to the detector size is less than two; and
    in response to a determination that the ratio of the requested image thickness to the detector size is less than two,
      determine an overlap value between two adjacent axial scans of the plurality of axial scans:
      determine the plurality of initial image locations based on the overlap value.

10. The system of claim 9, wherein a ratio of the overlap value to the detector size is an even number.

11. A method implemented on at least one device including at least one processor and a storage, the method comprising:
  obtaining scanning data of a subject, wherein the scanning data is generated by at least one detector via a plurality of axial scans;
  obtaining a scanning parameter wherein the scanning parameter include a detector size
  obtaining a requested reconstruction parameter, wherein the requested reconstruction parameter include a requested image increment and a requested image thickness;
  determining a plurality of initial image locations based on the scanning parameter and the requested reconstruction parameter;
  determining an intermediate reconstruction parameter based on the requested reconstruction parameter, wherein the intermediate reconstruction parameter includes an intermediate image increment and an intermediate image thickness;
  determining a plurality of intermediate image locations based on the requested reconstruction parameters and the intermediate reconstruction parameter, wherein an amount of the plurality of intermediate image locations is larger than an amount of the plurality of the initial image locations;
  determining a plurality of intermediate images based on the plurality of intermediate locations and the scanning data;
  determining a plurality of final images based on plurality of intermediate images and a filtering kernel.

12. The method of claim 11, wherein the method further comprises:
  determining a broadening size parameter based on the requested reconstruction parameter and the scanning parameter;
  determining the plurality of intermediate image locations based on the broadening size parameter.

13. The method of claim 12, wherein the intermediate image thickness equals to the detector size.

14. The method of claim 12, wherein to determine the broadening size parameter based on the requested reconstruction parameter and the scanning parameter, the method further comprises:
  determining whether the scanning data is acquired with axial deflection;
  in response to a determination that the scanning data is acquired with axial deflection,
    determining the intermediate image increment based on the requested image increment and the detector size;

determining the broadening size parameter based on the requested image thickness and the intermediate image increment.

15. The method of claim 14, wherein the method further comprises:
determining the filter based on a ratio of the requested image thickness to the intermediate image increment.

16. The method of claim 12, wherein the method further comprises:
determining whether the scanning data is acquired with axial deflection:
in response to a determination that the scanning data is acquired with axial deflection, determining whether the requested image thickness equals to the detector size:
in response to a determination that the requested image thickness equals to the detector size,
determine the intermediate image increment as the requested image increment divided by three.

17. The method of claim 16, wherein the method further comprises:
determining the filter based on a ratio of the detector size to the requested image increment.

18. The method of claim 12, wherein to determine the broadening size parameter based on the requested reconstruction parameter and the scanning parameter, the method further comprises:
determining whether the scanning data is acquired with axial deflection;
in response to a determination that the scanning data is acquired without axial deflection,
determining whether a ratio of the requested image thickness to the detector size is not less than two;
in response to a determination that the ratio of the requested image thickness to the detector size is not less than two,
determining the intermediate image increment based on the requested image increment and the detector size:
determining the broadening size parameter based on the intermediate image increment and the detector size.

19. The method of claim 11, wherein the method further comprises:
determining whether the scanning data is acquired with axial deflection:
in response to a determination that the scanning data is acquired without axial deflection,
determining whether the ratio of the requested image thickness to the detector size is less than two;
in response to a determination that the ratio of the requested image thickness to the detector size is less than two,
determining an overlap value between two adjacent axial scans of the plurality of axial scans;
determining a plurality of positions corresponding to the plurality of axial scans
determining the plurality of intermediate image location based on the overlap value and the plurality of positions corresponding to the plurality of axial scans.

20. A non-transitory computer readable medium comprising executable instructions that, wherein when executed by at least one processor, the executable instructions cause the at least one processor to effectuate a method comprising:
obtaining scanning data of an subject, wherein the scanning data is generated by at least one detector system via a plurality of axial scans;
obtaining a scanning parameter wherein the scanning parameter include a detector size
obtaining a requested reconstruction parameter, wherein the requested reconstruction parameter include a requested image increment and a requested image thickness:
determining a plurality of initial image locations based on the scanning parameter and the requested reconstruction parameter:
determining an intermediate reconstruction parameter based on the requested reconstruction parameter, wherein the intermediate reconstruction parameter include an intermediate image increment and an intermediate image thickness:
determining a plurality of intermediate image locations based on the requested reconstruction parameters, wherein an amount of the plurality of intermediate image locations is larger than an amount of the plurality of the initial images and the broadening size parameter:
determining an intermediate image volume based on the plurality of intermediate image locations and the scanning data:
determining a final image volume based on the intermediate image volume and a filter;
reconstructing an image of the subject based on the final image volume and the requested reconstruction parameters.

* * * * *